United States Patent [19]
Constanti

[11] 3,978,377
[45] Aug. 31, 1976

[54] HERMETIC BUSHING FOR TERMINALS FOR ELECTROLYTIC FILTER CAPACITORS

[75] Inventor: Jean Constanti, Poissy (Yvelines), France

[73] Assignee: Les Condensateurs Sic-Safco, Hauts-De-Seine, France

[22] Filed: May 3, 1974

[21] Appl. No.: 466,557

[30] Foreign Application Priority Data
June 7, 1973   France .............................. 73.20723

[52] U.S. Cl. ........................... 317/230; 339/218 M
[51] Int. Cl.² ........................................... H01G 9/00
[58] Field of Search ....... 339/218 R, 218 M, 218 C, 339/198 E, 198 G, 198 GA, 198 H, 263 R, 269, 271; 317/230, 242

[56] References Cited
UNITED STATES PATENTS

| | | |
|---|---|---|
| 1,517,017 | 11/1924 | Roth ............................... 339/198 E |
| 1,693,303 | 11/1928 | Mackintosh ..................... 339/198 E |
| 2,766,408 | 10/1956 | Georgiev et al. .................. 317/230 |
| 3,041,436 | 6/1962 | Brady ......................... 339/198 E X |
| 3,174,085 | 3/1965 | Schroeder, Jr. et al. ....... 317/242 X |
| 3,398,333 | 8/1968 | Zeppieri ............................. 317/230 |
| 3,654,524 | 4/1972 | Puppolo et al. ..................... 317/230 |
| 3,822,397 | 7/1974 | Puppolo et al. ..................... 317/230 |
| 3,842,325 | 10/1974 | Callius et al. ....................... 317/230 |

*Primary Examiner*—Roy Lake
*Assistant Examiner*—James W. Davie
*Attorney, Agent, or Firm*—Murray Schaffer

[57] ABSTRACT

An electrolytic filter capacitor has two terminals in a molded insulating cover. The terminals are identical and each is shaped as a polyhedron. The terminals which have means for connection to inner parts of the capacitor and to outer members such as bus bars occupy 15 – 40% of the exposed area of the cover. Each terminal has a plane of symmetry in the direction of maximum size which ae parallel and as closely spaced to each other as insulation requirements permit.

13 Claims, 8 Drawing Figures

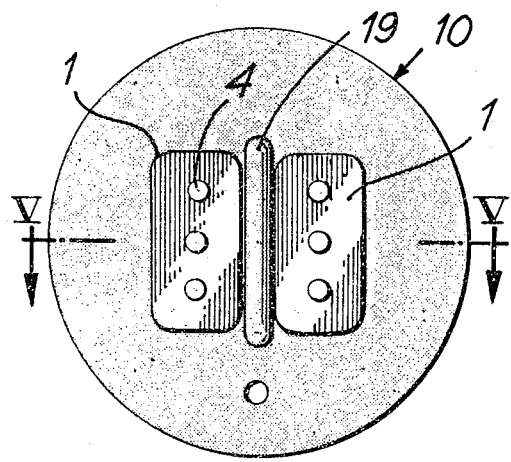
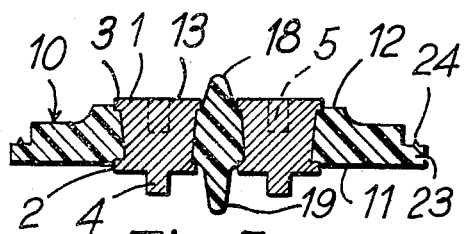
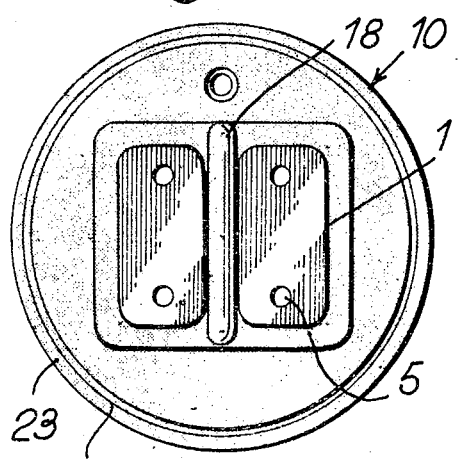
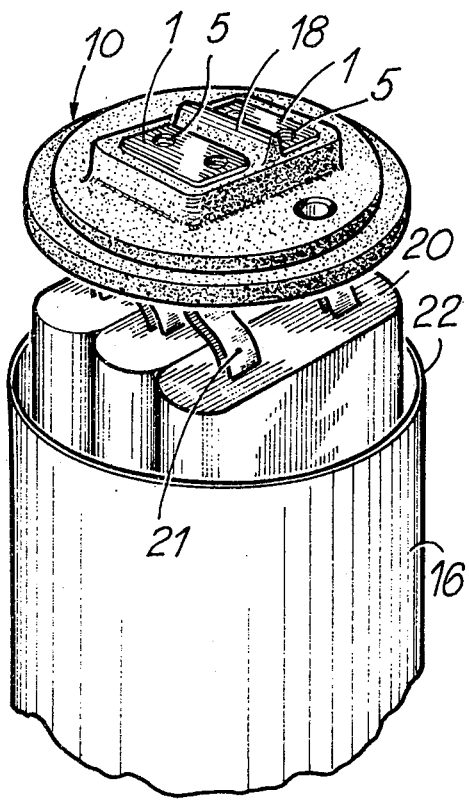

HERMETIC BUSHING FOR TERMINALS FOR ELECTROLYTIC FILTER CAPACITORS

BACKGROUND OF THE INVENTION

The present invention relates to the technical field of electrical capacitors.

A considerable proportion of the faults, and more particularly parasitic resistances which occur in electrolytic filter capacitors occur in the hermetic bushings for the terminals and in the latter. At present these terminals are inserted in the form of approximately cylindrical members made from light alloy or aluminium in a cover made from a thermosetting plastic of an aluminium case shaped by extruding. Such terminals are fixed in the cover material at the time of moulding and in each case comprise:

a threaded hole for receiving a clamping screw for connecting a lug to the load circuit;

connecting sleeves provided with uneven surfaces which bring about a keying in rotation and which envelop the tightening torques of the screw, which in addition increase the length of the leakage paths of the electrolyte within the case;

an inner connecting member on which is welded, riveted or both welded and riveted a connection to the internal capacitative member.

As an example, a capacitor having a capacitance of 47,000 µF under a continuous operating voltage of 6 V, a cover with a diameter of 72 mm is provided to seal the case having terminals with a diameter of 11 mm, although the surface area which they occupy only represents 4.7% of that of the cover. In such a capacitor the minimum impedance as a function of the frequency is 10 mOhm and the series resistance introduced by the terminals is 1 mOhm.

It can be seen that the cross-section of the terminals is too small to ensure that the heat emitting within the case is correctly removed by these terminals with a good thermal conductivity when the capacitor is subjected to a high alternating current load.

The internal connecting lugs can only be fixed to each terminal via a single member. This is troublesome when the number of the said lugs is increased in order to reduce the series resistance and self-induction of the capacitative members produced in the form of coils.

Finally, when the capacitor is not connected to the load circuit by means of lugs and cables, but is connected on connecting bars called busbars, the mounting provided by two screws is weak relative to the vibrations which occur. If the capacitor is mounted in this manner in the horizontal position it can oscillate and become detached, so it is necessary to fix it by means of a supplementary clip.

SUMMARY OF THE INVENTION

The present invention more particularly aims at improving such bushings for terminals and also to improve the terminals themselves.

To this end the invention relates to an arrangement which comprises in a cover made of insulating material two secured terminals, whereby each metal terminal has the shape of a polyhedron rectangular pyramid frustum or cone frustum, whereby the said terminals are mutually arranged in such a way that the cross-sections of the two polyhedrons contained in the respective planes of symmetry offering the maximum lengths are located parallel and very close together.

Moreover, the said terminals are given the maximum volume compatible with the techniques of moulding.

Their face which is exposed to the outside is provided with at least two threaded holes for receiving clamping screws on lugs or bars. Their inner face is provided with at least three joining members with internal connecting lugs.

The exposed face can have such a size that it represents 15–40%, for the two terminals together, of the surface area of the insulating cover.

With such an arrangement the terminals have a very low series-resistance on the electrical plane, a very low thermal resistance, a very small self-induction, multiple fixing points for the inner connecting lugs, a considerable mechanical rigidity of fixing to the bars and a high reliability of electrical insulation between the terminals and connections of opposite polarities.

The following description made with reference to the attached drawings given as non-limitative examples permits a better comprehension of how the invention is put into practice.

BRIEF DESCRIPTION OF THE DRAWINGS

FIG. 4 shows in a view from below the cover of a capacitor case;

FIG. 5 shows a section along the line V—V of FIG. 4;

FIG. 6 shows a plan view;

FIG. 7 shows an exploded perspective view of the case, cover and capacitative windings of a capacitor produced in this way;

DESCRIPTION OF THE PREFERRED EMBODIMENTS

Figure 1:
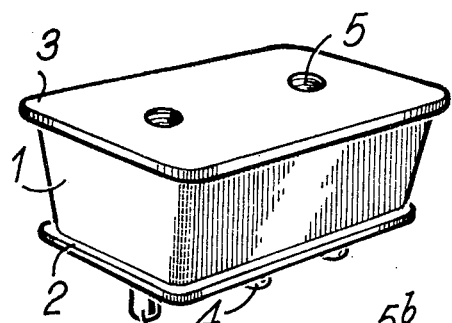
FIG. 1 shows in perspective a terminal according to the invention.

The terminal shown in FIG. 1 has a body 1 in the form of an upright frustum of a pyramid with rectangular bases. The smaller base 2 has a projecting peripheral rib and the larger base 3 is also provided with a projecting peripheral rib. From the smaller base project three members 4 which will receive by welding, riveting or both welding and riveting connecting lugs forming the outlets for the capacitative members. On the larger base there are two threaded bores 5 which serve to receive the clamping screws for the external connecting members.

This metal terminal is made from refined aluminium or an aluminium alloy compatible with the electrolyte of the capacitor.

Figure 2:
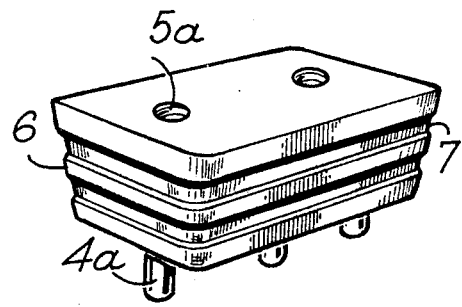
FIG. 2 shows a first variant thereof.

In FIG. 2 there is an upright prismatic shaped terminal 6, having a rectangular base and in the lateral surface of which are grooves 7 for insertion into the insulating material of a capacitor case cover. Terminal 6 also has on one face three projecting members 4a, and on the other face two threaded bores 5a. While this prism does not have ribs, the bases each have a flat inner projecting connecting sleeve for receiving the connecting members in order to disengage the same from the insulating material of the capacitor case cover.

Figure 3:
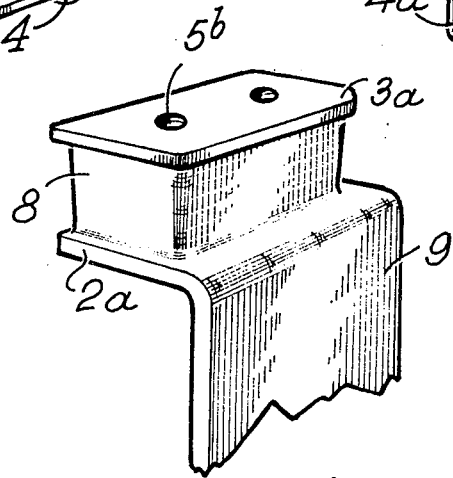
FIG. 3 shows in analogous manner a second variant.

Another configuration is shown in FIG. 3 wherein a terminal 8 is shaped like the frustum of a pyramid and has on its large base a projecting peripheral rib 3a, and two threaded bores 5b, whilst the small base has a peripheral rib 2a which is extended on one side by an elbowed lug or tab 9 for the internal connection to the capacitative members.

As can be seen in FIGS. 4–6 a pair of such terminals 1,6 or 8 is inserted in a cover 10 made from a thermosetting plastic material having a phenol or diallyl phthalate resin base, in such a way that ribs 2 and 3 are only partly embedded therein, and therefore project slightly above the inner face 11 and outer face 12 of the insulating material of the cover. The outer face 13 of the projecting rib 3 is contained in the same plane as the homologous face of the adjacent terminal. This plane can be that of the bus bars 14 and 15 shown in FIG. 8 which shows a group of capacitors 17, 17a mounted in parallel.

In the case of using pyramidal terminals, the insertion offers good stability of an extended leakage path for the sealing, without it however being necessary to provide a set of ribs on the lateral surface of the pyramid frustum. If a prismatic cross-section, as shown in FIG. 2, is used, the grooves 7 serve to extend the leakage path and for consolidation purposes. In both cases the stability of the mounting is reinforced by the length of the junction surfaces between the solid terminals and the plastic material.

The terminals shown offer relatively long rectangular faces. The mutual arrangement is such that the symmetry planes of the two terminals passing through the large axes of the rectangular faces are mutually parallel and as close together as possible, so that it is possible to reduce to a minimum the self-induction reactance, bearing in mind the distance necessary for retaining an adequate insulation. With this close positioning a projecting rib 18 must be provided between the two heads of the terminals which are exposed to the outside, the rib 18 being formed by molding it simultaneously in the plastic material of cover 10. In addition, an inner intermediate rib 19 must be provided for the mechanical and electrical insulation of the positive and negative connecting lugs or tabs of the inner capacitative members connected to members 4. The height of the ribs 18 and 19 may be reduced to the minimum which is compatible with the necessary electrical insulation.

As can be seen in FIG. 7, the capacitative coils 20 are connected by their multiple connecting tabs 21 to the different members 4 appropriate for the terminals 1 inserted in the material of cover 10, and the assembly is associated with the case 16 made from aluminium or an aluminium base alloy compatible with the electrolyte, whose edge 22 will be crimped with the interpositioning of a not shown elastic sealing joint on the edge 23 of cover 10. The upper face of the said edge is provided with a circular pointed rib 24 embedded in the material of the joint.

Figure 8:
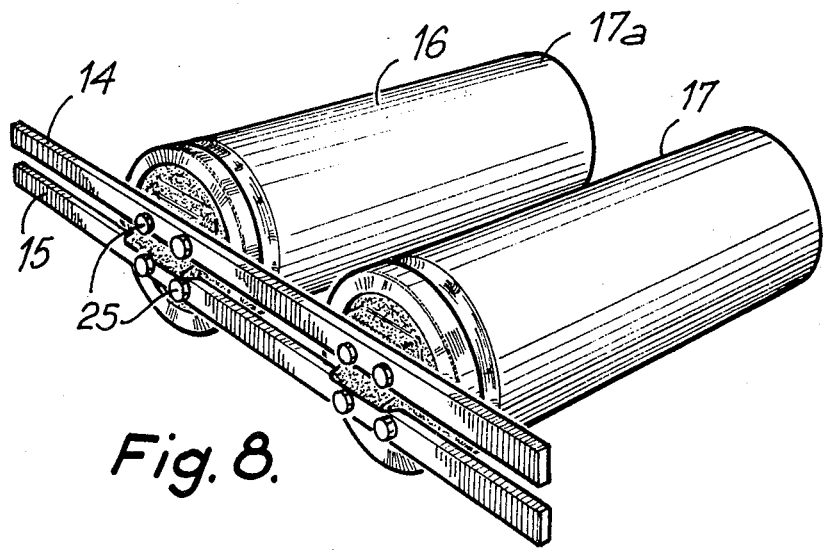
FIG. 8 shows a perspective view of the assembly of such a capacitor on busbars.

The arrangements described hereinbefore offer definite advantages relative to the prior art which can be illustrated by referring to a specific example. In a cover 10 with a diameter of 72 mm the pair of terminals 1 is given a size such that area occupied by heads 13 represents 22% of the total area of the cover. Under these conditions it should be noted that the thermal conductivity, determined according to Fourier's law is 0.176 kcal/m.H°C, whilst with the conventional terminals according to the prior art this thermal conductivity is 0.038 kcal/m.H°C with refined aluminium whose conductivity factor is 196. The series-resistance introduced by the terminals described into the capacitor circuit is 0.2 mOhm. The inner connecting lugs can be connected at several points to each terminal. In a capacitor fixed as shown in FIG. 8 with the axis of its case arranged horizontally via its terminals by means of bolts 25, secured in bores 5, and passing through corresponding holes in busbars 14,15, mechanically excited at its resonant frequency by vibrations perpendicular to the plane containing the locking axes, it can be seen that the mounting is maintained without detachment, whilst in the case of capacitors provided with conventional terminals each locked by a single bolt, play rapidly develops.

This considerable decrease in the series-resistance also leads to a considerable decrease in the self-induction reactance.

The following table summarises in comparative manner the characteristics obtained with the above-described arrangements compared with those of the prior art:

| Characteristics | Prior art | Arrangement according to the present application |
| --- | --- | --- |
| Series-resistance in mOhm | 1.0 | 0.2 |
| Self-induction reactance in $\mu$F | 0.75 | 0.35 |
| Heat removal surface area by the two terminals as a percentage of the cover area | 4.7 | 22% (can vary from 15–40%) |
| Number of fixing points of external connections | 2 | at least 4 |
| Number of fixing points of internal connections | 2 | (can vary between 4 and 8) |
| Behaviour of the mounting to resonant vibrations orthogonal to the fixed capacitor axis | Becomes detached | Does not become detached |

Obviously, as can be seen on reading the above table, the number of fixing points for the internal connections is at least two per terminal and can reach four, whilst the number of fixing points for the external connections is at least two per terminal and can exceed 3. It is also obvious that a terminal in the shape of a pyramid frustum with or without peripheral ribs could be provided with grooves analogous to groove 7 and a prismatic terminal can have besides the grooves, ribs analogous to ribs 2 and 3. Any terminal can also be provided with an elbowed extension such as extension 9 which may or may not extend a rib, and be provided with connecting members.

In conclusion, it is pointed out that when much better filtering characteristics are required in pulsating current supply systems, it is necessary to use electrolytic capacitors whose impedance curve as a function of the frequency is much better than that of present-day capacitors.

In the extreme case, a capacitor without a series-resistance would give a V-shaped impedance curve, whereof the downward branch corresponds to the "capacitative reactance" and the upward branch to the "self-induction reactance" as a function of the frequency. It can be deduced from this that a filter capacitor on the basis of results comes closer to perfection as its series-resistance and self-induction resistance become proportionately smaller. Therefore such a capacitor becomes capable of ensuring an improved filtering of the frequencies to be eliminated, whilst raising to the maximum the permitted traversing alternating load.

The arrangements described hereinbefore lead to such results whilst reducing to a minimum the parasitic self-inductions and series-resistances.

It is obvious that without leaving the scope of the invention as defined in the following claims, other changes can be made to the embodiments described hereinbefore.

I claim:

1. An electrolytic filter capacitor having a case enclosing capacitive members and a bushing for hermetically sealing said capacitor, said bushing comprising a cover having an inner and an outer side made from molded insulating material and a pair of identical, solid, polyhedron shaped terminals having parallel planes of symmetry in the direction of maximum size, said terminals being set within said cover as closely spaced to each other as insulation requirements permit, and having their bases raised above the respective sides of said cover, the outer base defining an exposed contact head which occupies 15–40% of the exposed area of the cover and which is adapted for fastening directly to a bus bar, the inner base being exposed for connection to the capacitor.

2. A bushing according to claim 1, wherein each terminal has the shape of the frustum of a pyramid with rectangular bases.

3. A bushing according to claim 1, wherein each terminal has the shape of an upright prism with a rectangular base.

4. A bushing according to claim 1 wherein the lateral surface of each of the terminals is provided with grooves.

5. A bushing according to claim 1 wherein at least one of the bases of each of the terminals have extensions in the form of ribs.

6. A bushing according to claim 1 wherein the terminal has an inner base provided with a lateral extension for connecting lugs within the capacitor.

7. A bushing according to claim 1 wherein the terminal has an inner base provided with multiple members for connecting internal connecting lugs of the capacitor.

8. A bushing according to claim 1, wherein the base forming the outer head of the terminal is provided with means for connecting said bushing to a member outside the capacitor.

9. A bushing according to claim 8, wherein the connecting means comprise at least two threaded bores for locking bolts for each terminal.

10. A bushing according to claim 1, wherein the terminals have planar outer faces arranged in coplanar manner.

11. A bushing according to claim 9, wherein the external connections are provided by screws in the said threaded bores.

12. A bushing according to claim 1, wherein an insulating separating rib is located between said terminals, said rib having a minimum height and thickness determined as a function of the insulation required.

13. A bushing according to claim 1, wherein each terminal is made from a metal compatible with the electrolyte of the capacitor, the said metal being selected from a group consisting of at least refined aluminium and aluminium alloys.

* * * * *